(12) United States Patent
Kuchinisky et al.

(10) Patent No.: US 9,618,672 B2
(45) Date of Patent: Apr. 11, 2017

(54) UNIFORM ILLUMINATION LIGHT DIFFUSING FIBER DEVICE

(71) Applicant: Corning Incorporated, Corning, NY (US)

(72) Inventors: Sergey Anatol'evich Kuchinisky, St. Petersburg (RU); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 185 days.

(21) Appl. No.: 14/278,349

(22) Filed: May 15, 2014

(65) Prior Publication Data

US 2014/0355295 A1  Dec. 4, 2014

Related U.S. Application Data

(60) Provisional application No. 61/829,624, filed on May 31, 2013.

(51) Int. Cl.
| | | |
|---|---|---|
| *F21V 8/00* | (2006.01) | |
| *B82Y 20/00* | (2011.01) | |
| *G02B 6/02* | (2006.01) | |

(52) U.S. Cl.
CPC ............ *G02B 6/001* (2013.01); *B82Y 20/00* (2013.01); *G02B 6/0068* (2013.01); *G02B 6/02338* (2013.01); *G02B 6/02366* (2013.01)

(58) Field of Classification Search
CPC ....................................................... G02B 6/001
See application file for complete search history.

(56) References Cited

U.S. PATENT DOCUMENTS 5,245,404 A * 9/1993 Jannson ............... H04J 14/02
                                                       356/301
8,408,029 B2    4/2013 De Angelis et al.
(Continued)

FOREIGN PATENT DOCUMENTS

WO    2010011299 A2    1/2010
WO    2011063214       5/2011
(Continued)

OTHER PUBLICATIONS

Written Opinion of the International Searching Authority, dated May 27, 2014, pp. 1-8, International Patent Application No. PCT/US2014/039483, European Patent Office, The Netherlands.
(Continued)

*Primary Examiner* — Omar R Rojas
(74) *Attorney, Agent, or Firm* — Svetlana Z. Short

(57) ABSTRACT

An illumination device comprising: (i) a light diffusing optical fiber having a numerical aperture of $NA_{LDF}$, wherein said light diffusing optical fiber has an outer surface, two ends, and a core, the fiber comprising a region with a plurality of scattering structures within said core configured to scatter guided light via said scattering structures towards the outer surface providing scattering-induced attenuation greater than 50 dB/km at illumination wavelength, wherein said scatter guided light diffuses through said outer surface to provide illumination; (ii) a light source having a numerical aperture of $NA_{S1}$, said light source being optically coupled to one end of said light diffusing optical fiber; $NA_{LDF} - NA_{S1} > 0.05$.

21 Claims, 7 Drawing Sheets

(56) References Cited

U.S. PATENT DOCUMENTS

| | | |
|---|---|---|
| 8,492,448 B2 | 7/2013 | Dewa et al. |
| 8,545,076 B2 | 10/2013 | Bickham et al. |
| 8,591,087 B2 | 11/2013 | Bickham et al. |
| 8,620,125 B2 | 12/2013 | Button et al. |
| 8,683,827 B2 | 4/2014 | De Angelis et al. |
| 8,724,942 B2 | 5/2014 | Logunov et al. |
| 8,787,717 B2 | 7/2014 | Logunov |
| 8,897,612 B2 | 11/2014 | Logunov |
| 8,929,703 B2 | 1/2015 | Logunov et al. |
| 9,025,923 B2 | 5/2015 | Logunov et al. |
| 9,146,347 B2 | 9/2015 | Logunov et al. |
| 2011/0122646 A1* | 5/2011 | Bickham ............ G02B 6/0003 362/554 |
| 2013/0107565 A1 | 5/2013 | Genier |
| 2013/0272014 A1 | 10/2013 | Logunov et al. |
| 2015/0369986 A1 | 12/2015 | Logunov et al. |

FOREIGN PATENT DOCUMENTS

| | | |
|---|---|---|
| WO | 2011063214 A1 | 5/2011 |
| WO | 2013055842 A1 | 4/2013 |

OTHER PUBLICATIONS

International Search Report, dated May 27, 2014, pp. 1-6, International Patent Application No. PCT/US2014/039483, European Patent Office, The Netherlands.

Endruweit, "Spectroscopic Experiments Regarding the Efficiency of Side Emission Optical Fibers in the UV-A and Visible Blue Spectrum," Optics and Lasers in Engineering; 2008 46(2):97-105.

PCT Search Report. International Searching Authority. Date of Mailing Jul. 25, 2014; pp. 1-6.

\* cited by examiner

UNIFORM ILLUMINATION LIGHT DIFFUSING FIBER DEVICE

This application claims the benefit of priority under 35 U.S.C. §119 of U.S. Provisional Application Ser. No. 61/829,624 filed on May 31, 2013 and the contents of which are relied upon and incorporated herein by reference in their entirety.

BACKGROUND

The disclosure generally relates to light diffusing optical fibers for use in illumination applications, and, more specifically, to light diffusing optical fibers and illumination devices utilizing such fibers.

SUMMARY

According to some embodiments an illumination device includes a light source and at least one light diffusing optical fiber. The light source is coupled to the fiber and the numerical aperture of the light source is smaller than that of the fiber.

More specifically, according to some embodiments, the illumination device comprises: (i) a light diffusing optical fiber having a numerical aperture of $NA_{LDF}$, wherein said light diffusing optical fiber has an outer surface, two ends, a core, and a cladding, the fiber comprising a region with a plurality of scattering structures configured to scatter guided light via the scattering structures towards the outer surface providing scattering-induced attenuation greater than 50 dB/km at illumination wavelength, wherein said scatter guided light diffuses through said outer surface to provide illumination; (ii) a light source having a numerical aperture of $NA_{S1}$, the light source being optically coupled to one end of said light diffusing optical fiber; such that $NA_{LDF}-NA_{S1}>0.05$. In some embodiments, $NA_{LDF}-NA_{S1}>0.02$. In some embodiments, $0.05 \leq NA_{S1} \leq 0.3$ and $0.31 \leq NA_{LDF} \leq 0.52$. According to some embodiments the fiber is surrounded by a scattering coating or a jacket that improves angular scattering, and thus angular illumination.

According to some embodiments, the illumination device comprises:

(i) a light diffusing optical fiber having a numerical aperture of $NA_{LDF}$, wherein said light diffusing optical fiber has an outer surface, two ends, and a glass core comprising a region with a plurality of scattering structures within said core configured to scatter guided light via said scattering structures towards the outer surface providing scattering-induced attenuation greater than 50 dB/km at illumination wavelength, wherein said scatter guided light diffuses through said outer surface to provide illumination; (ii) a light source having a numerical aperture of $NA_{S1}$, said light source being optically coupled to one end of said light diffusing optical fiber; $NA_{LDF}-NA_{S1}>0.05$. In some embodiments, $NA_{LDF}-NA_{S1}>0.02$. In some embodiments, $0.05 \leq NA_{S1} \leq 0.3$ and $0.31 \leq NA_{LDF} \leq 0.52$. According to some embodiments the fiber is surrounded by a scattering coating or a jacket that improves angular scattering, and thus angular illumination.

According to the embodiments described herein, the illumination device provides a substantially uniform illumination due to scattering, such that the difference between the minimum and maximum scattering illumination intensity is less than 50% of the maximum scattering illumination intensity, for all viewing angles between 40 and 120 degrees.

According to some embodiments, the illumination device comprises:

(i) a light diffusing optical fiber having a numerical aperture of $NA_{LDF}$, wherein said light diffusing optical fiber has an outer surface, two ends, and a glass core comprising a region with a plurality of nano-sized structures within said core configured to scatter guided light via said nano-sized structures towards the outer surface providing scattering-induced attenuation greater than 50 dB/km at illumination wavelength, wherein the scatter guided light diffuses through said outer surface to provide illumination;

(ii) a light source having a numerical aperture of $NA_{S1}$, said light source being optically coupled to one end of said light diffusing optical fiber; and wherein $NA_{LDF}-NA_{S1}>0.02$.

According to some embodiments the light source coupled to the fiber generates light in 200 nm to 500 nm wavelength range and fluorescent material in the fiber coating generates either white, green, red, blue, or NIR (near infrared) light. According to some embodiments the light source coupled to the fiber generates light in 200 nm to 1200 nm wavelength range.

According to some embodiments, the illumination device includes a single light diffusing fiber. According to other embodiments the illumination system includes a plurality of light diffusing fibers. The light diffusing fibers may be utilized in a straight configuration, or may be bent. The light diffusing fibers fiber may have scattering-induced attenuation between 100 dB/km and 60000 dB/km at illumination wavelength.

According to some embodiments, $NA_{LDF}-NA_{S1}>0.05$. According to some embodiments, $0.05 \leq NA_{S1} \leq 0.3$. According to some embodiments, wherein $0.31 \leq NA_{LDF} \leq 0.52$.

According to some embodiments the illumination device further comprises a second light source. The second light souse is coupled to another end of the light diffusing optical fiber. The second light source has a numerical aperture of $NA_{S2}$, wherein $NA_{LDF}-NA_{S2}>0.02$. Preferably, $NA_{LDF}-NA_{S2}>0.05$. Also preferably, $0.05 \leq NA_{S2} \leq 0.3$.

According to some embodiments the illumination device further comprises a delivery fiber having a numerical aperture $NA_{delivery}$, wherein (i) the light source is coupled to one end said delivery fiber and the light diffusing optical fiber is coupled to another end of said delivery fiber, and $NA_{delivery} < NA_{LDF}$.

According to some embodiments of the illumination device the light diffusing optical fiber further comprises a light scattering/homogenizing coating surrounding the fiber cladding or a protective coating layer. The scattering/homogenizing coating may include at least one of the following scattering materials: titania, alumina, silica.

BRIEF DESCRIPTION OF THE DRAWINGS

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein

DETAILED DESCRIPTION

Figure 1A:
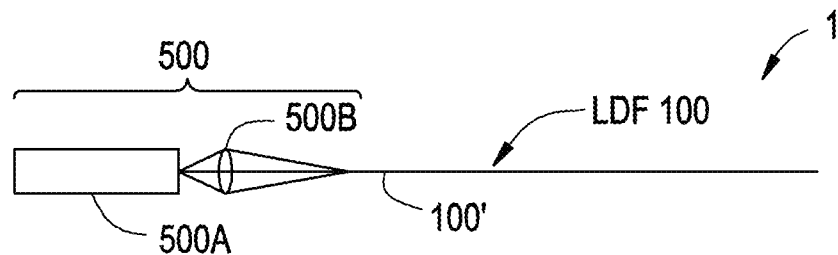
FIGS. 1A and 1B illustrate schematically two embodiments of illumination device that includes a light diffusing fiber.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and/or C are disclosed as well as a class of substituents D, E, and/or F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The "refractive index profile" is the relationship between the refractive index or the relative refractive index and the waveguide (fiber) radius.

The "relative refractive index percent" is defined as $$\Delta(r)\% = 100 \times [n(r)^2 - n_{REF}^2] / 2n(r)^2,$$

where n(r) is the refractive index at radius r, unless otherwise specified. The relative refractive index percent is defined at 850 nm unless otherwise specified. For example, the reference index $n_{REF}$ is silica glass with the refractive index of 1.452498 at 850 nm. In some embodiments, the reference index $n_{REF}$ is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

Likewise, one or more other dopants which are not downdopants may be present in a region of an optical fiber having a negative relative refractive index.

The term "α-profile" or "alpha profile" refers to a relative refractive index profile, expressed in terms of Δ(r) which is in units of "%", where r is the radius, which follows the equation, $$\Delta(r)=\Delta(r_o)(1-[|r-r_o|/(r_f-r_o)]^\alpha),$$

where $r_o$ is the point at which Δ(r) is maximum, $r_f$ is the point at which Δ(r)% is zero, and r is in the range $r_i \leq r \leq r_f$, where Δ is defined above, $r_i$ is the initial point of the α-profile, $r_f$ is the final point of the a-profile, and a is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm. In other embodiments, one or more segments of the refractive index profile have a substantially step index shape with an α value greater than 8, more preferably greater than 10, and even more preferably greater than 20 as measured at 850 nm.

As used herein, the term "step- index" profile includes refractive index profiles with constant refractive index in the core, at different radial position within the core.

Illumination Device

A desirable attribute of at least some of the embodiments of the present invention described herein is an illumination device that utilizes light diffusing fiber and provides uniform and high illumination along the length of the fiber.

In at least some embodiments, the intensity variation of the integrated (diffused) light intensity coming through the sides of the fiber at the illumination wavelength is less than 20% for the target length of the fiber, which can be, for example, 0.02 m–100 m length (e.g., 0.2 m to 10 m). Such fibers could be used, for example, as replacements for other conventional lighting objects, but have the additional advantages of: (i) being much thinner than conventional light sources, and therefore can be used with thin illuminating substrates; and/or (ii) being able to function as a cool light source—i.e., the light diffusing fiber does not heat up while producing the required illumination—this feature is advantageous when the fibers 100, or fiber bundles or fiber ribbons containing such fibers are used in environments that have to stay cold, or in the areas where they are used as a light source that is easily accessible to children or others, without a threat of potentially burning someone when handled directly.

A typical fiber system includes a light source coupled to a fiber where, in order to provide as much light intensity into the fiber core as possible, the light source has a numerical apertures equal to that of the optical fiber. In typical light diffusing fibers, light escapes from the fiber core, and the intensity of light diffused out of the outer surface of such fiber is reduced as the light propagates along the length of the fiber, due to immediate exponential decay in the intensity of the light that is propagating through the core. However, the embodiments of the present invention disclosed herein solve this problem by providing light that is uniform in intensity, as a function of fiber length.

Figure 1B:
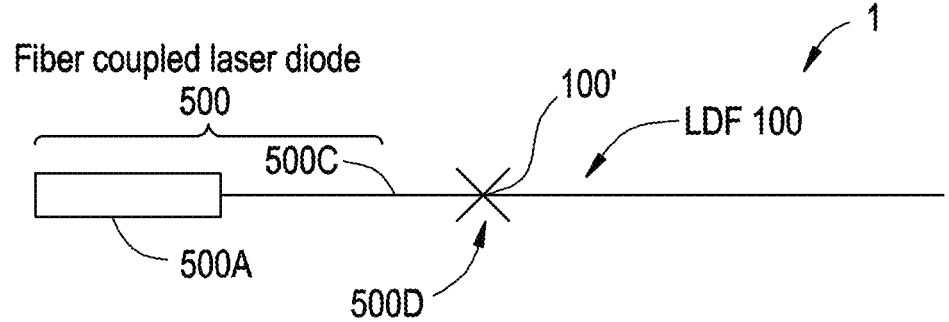

Referring to FIGS. 1A and 1B, according to some embodiments an illumination device 1 includes at least one light diffusing optical fiber (LDF) 100 optically coupled to the light source 500. The term "light-diffusing" means that light scattering is substantially spatially continuous along at least a portion of the length of the light-diffusing optical fiber 100, i.e., there are no substantial jumps or discontinuities such as those associated with discrete (e.g., point) scattering. Thus, the concept of substantially continuous light emission or substantially continuous light scattering as set forth in the present disclosure refers to spatial continuity. The light diffusing optical fiber 100 (see FIGS. 2A, 2B, for example) has a glass core 110 with numerical aperture of $NA_{LDF}$, an outer surface, and two ends 100' and 100". The glass core 110 includes a region 116 with a plurality of scattering structures 100A (e.g., micro- or nano-sized structures) within the core, and the scattering structures 100A are configured to scatter guided light towards the outer surface, providing scattering-induced attenuation greater than 50 dB/km at the illumination wavelength. The scatter guided light diffuses through the outer surface of the fiber to provide illumination. The light source 500 of the illumination device 1 has a numerical aperture of $NA_{S1}$, where $NA_{LDF} > NA_{S1}$. While not being bound by theory, we realized that if a light source has a lower numerical aperture than the light diffusing optical fiber 100, then it takes a certain "diffusion distance" to completely fill the mode content of the light diffusing optical fiber 100. In this regard, without willing to be bound to any theory, we realized that in light diffusing fibers, the low NA mode content of the light diffusing optical fiber 100 has a lower loss rate due to diffusivity than the higher NA modes. Therefore, because it takes a certain distance to completely fill the mode content of the light diffusing optical fiber 100, the brightness of at the beginning portion of the fiber (i.e., illumination provided by the LDF) does not immediately decrease with increasing fiber length due to light loss through diffusion. Instead, Applicants believe that as the mode content of light propagating through the fiber core increases, it compensates for the exponential decay in the intensity of light that is propagating through the core, achieving relatively uniform illumination along the fiber length. For example, light source 500 may be is chosen such that $NA_{LDF} - NA_{S1} > 0.02$. According to some embodiments, $NA_{LDF} > 0.3$, for example between 0.3 and 0.5. For example, according to some embodiments, $NA_{LDF}$ may be 0.33, 0.35, 0.45, 0.48, 0.5 or therebetween. The difference between the numerical apertures between the light source(s) 500 and the fiber 100 and the choice of their NAs influences the length of the distance where the mode content of light diffusing optical fiber 100 becomes full. Thus, given a particular length of the light diffusing fiber, one can chose the numerical aperture(s) of the light source(s) and that of the fiber to provide more uniform illumination along the length of the light diffusing optical fiber 100. According to some embodiments, $NA_{S1} < 0.3$. According to some embodiments, $NA_{S1} < 0.2$, and in some embodiments $NA_{S1} < 0.1$.

In the embodiment depicted in FIG. 1A, light source 500 comprises a light source component 500A coupled to the lens 500B. The light diffusing optical fiber 100 is thus optically coupled via fiber end 100' to a light source component 500A through the lens 500B. In the embodiment depicted in FIG. 1B, light source 500 comprises a light source component 500A coupled to the light delivery fiber 500C. The coupling between the light delivery fiber 500C and light diffusing optical fiber 100 can be done, for by a standard optical fiber coupler 500D, or by splicing the fiber end 100' of the light diffusing optical fiber 100 to the adjacent end of the delivery fiber 500C. The light diffusing optical fiber 100 is thus coupled via fiber end 100' to a light source component 500A via the delivery fiber 500C.

A light diffusing fiber 100 may include one or more core regions with scattering structures, such as randomly distributed voids example. Some examples of light-diffusing optical fibers having randomly arranged and randomly sized voids (also referred to as "random air lines" or "nanostructures" or "nano-sized structures") are described in U.S. Pat. No. 7,450,806, and in U.S. patent application Ser. No. 12/950,045, which patent and patent application are incorporated by reference herein. Alternatively, other scattering structures such as small light scattering particles, or dopants within the fiber core may also be utilized. Also, alternatively, the light diffusing fiber 100 may have a "roughened" core, where the irregularities on the surface of the core at the core-cladding interface causes light scatter. Other types of light diffusing fibers may also be utilized. Light diffusing fibers 100 fiber may have scattering-induced attenuation (i.e., attenuation due to light lost through the outer surface of the fiber, not due to absorption of scattering particles within the core) greater than 50 dB/km, for example between 100 dB/km and 60000 dB/km at illumination wavelength.

Figure 3:
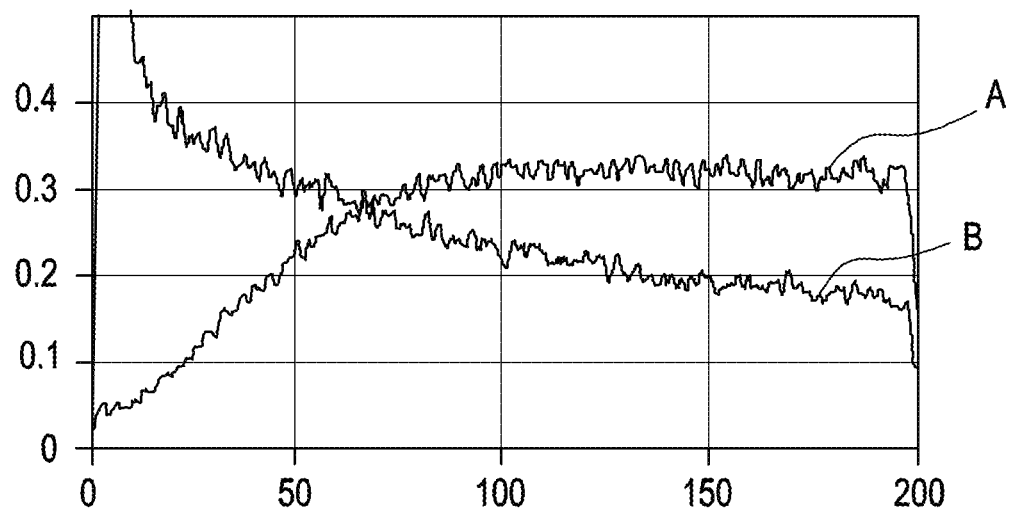
FIG. 3 illustrates the modeled light intensity of one embodiment of illumination device, as light is propagating through 200 cm long length of light diffusing fiber.
Figure 4:
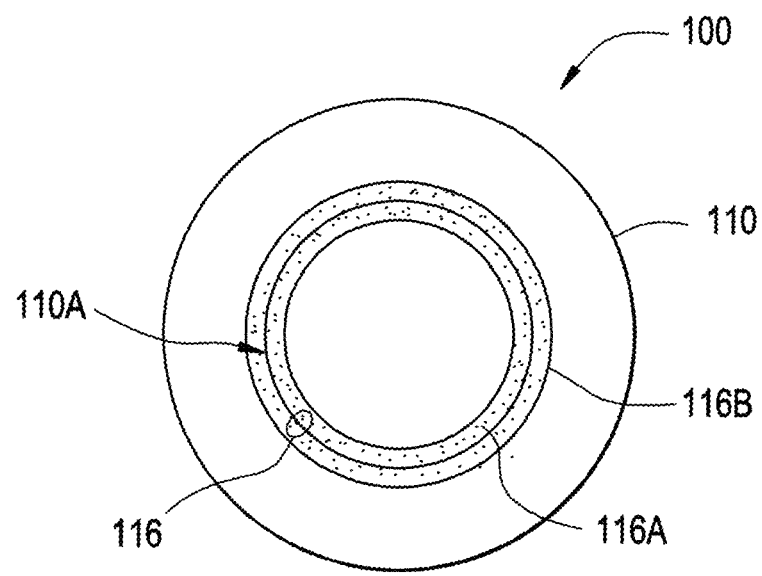
FIG. 4 illustrates schematically another embodiment of light diffusing fiber.

For example, FIG. 3 illustrates the modeled light intensity, as light propagates through a 200 cm long light diffusing fiber 100. This exemplary fiber embodiment is illustrated in FIG. 4. It includes a core 110 that is 62.5 µm in radius with an index of refraction n=1.46 at λ=589.3 nm. The core 110 includes a scattering region comprising scattering structures 100A (in this embodiment gas filled voids). The modeling was performed with the ray tracing software application ZEMAX, available from Radiant Zemax, LLC, of Redmond, Wash., USA. The scattering region of the core (region 116) comprising the scattering structures 100A was modeled as a scattering volume characterized by the photon mean free path and the scattering angle. The modeled scattering mean free path (MFP) is 3 cm, and the scattering angle is 5°. (MFP is the average distance that the light ray travels between two scattering events, and the scattering angle is the average angle between the ray directions before and after a single scattering event.) A part of the scattering region has refractive index that is smaller than that of the silica core, and the rest of the scattering region is assumed to have an index close to the index of the silica core, mimicking penetration of the light guided in the scattering region 116 (e.g. a glass ring with gas filled voids 116'). More specifically, in this embodiment, the scattering region 116 includes two layers 116A and 116B with gas filled voids. The numerical aperture $NA_{LDF}$ of this fiber is 0.34. According to one exemplary embodiment, illumination device 1 includes at least one light diffusing optical fiber (LDF) 100 optically coupled to the light source 500, where the light source 500 has $NA_{S1}$=0.17. Thus, $NA_{LDF}$>$NA_{S1}$, and more specifically $NA_{LDF}$−$NA_{S1}$=0.17. FIG. 3 illustrates that in this embodiment of the illumination device 1, the light intensity in the first 1 m length of fiber 100 increases due to gradual mode filling (plot A), and thus compensates for the intensity of light that is lost due to loss of light diffusing through the outer surface of the fiber. FIG. 3 also illustrates modeled intensity of a comparative illumination device (plot B). The comparative device model utilized the same optical fiber 100, but the fiber was coupled to a light source with a numerical aperture of 0.36. As shown in FIG. 4 in the comparative device, the intensity of the light propagating through a 200m length of the optical fiber continuously decreases, because the NA of the light source was larger than that of the fiber.

According to some embodiments, the illumination system includes a single light diffusing fiber 100. According to other embodiments the illumination device includes a plurality of light diffusing fibers. These light diffusing fiber(s) may be utilized in a straight configuration, or may be bent.

It is noted different types of light diffusing fibers or side emitting fibers may also be utilized in the illumination device 1. Thus, an illumination device 1 comprises: (i) a light diffusing optical fiber or a side emitting fiber having a numerical aperture of $NA_{LDF}$, wherein the light diffusing optical fiber has an outer surface, two ends, and a core, and a cladding, the fiber comprising a region with a plurality of scattering structures configured to scatter guided light via the scattering structures towards the outer surface providing scattering-induced attenuation greater than 50 dB/km (and preferably greater than 100 dB/km) at illumination wavelength, the scatter guided light diffuses through the outer surface to provide illumination; (ii) a light source having a numerical aperture of $NA_{S1}$, said light source being optically coupled to one end of said light diffusing optical fiber; $NA_{LDF}$−$NA_{S1}$>0.05. The light diffusing fibers or side emitting fibers utilized in such an illumination devise may include scattering structures in fiber cladding, and/or on core/cladding interface. According to some embodiments, $NA_{LDF}$−$NA_{S1}$>0.05. In some exemplary embodiments, $NA_{LDF}$−$NA_{S1}$≥0.1. In some exemplary embodiments, $NA_{LDF}$−$NA_{S1}$≥0.15. According to some embodiments, 0.05≤$NA_{S1}$≤0.3. According to some embodiments, 0.31≤$NA_{LDF}$≤0.52.

Figure 5:
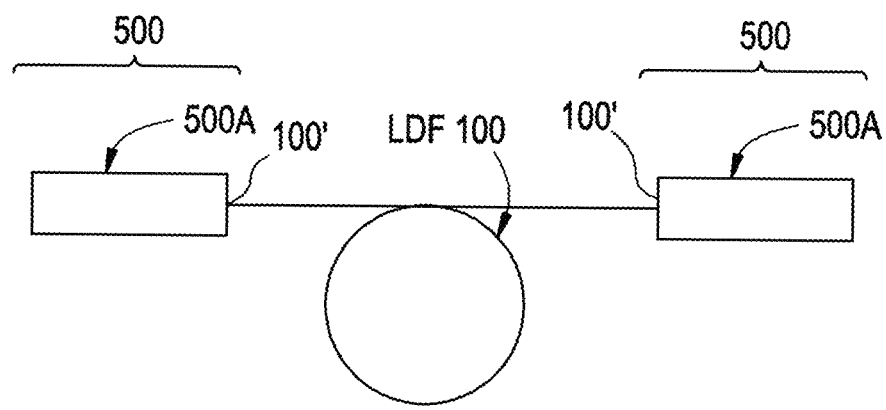
FIG. 5 illustrates schematically another embodiment of the illumination device that includes a light diffusing fiber and two light sources coupled to the opposite ends of this fiber.

As shown in FIG. 5, according to some embodiments the illumination device 1 further comprises a second light source 550. In this exemplary embodiment the first light source 500 is coupled to the other end 100' of the light diffusing optical fiber 100', and the second light source 550 is coupled to another end 100" of the light diffusing optical fiber 100. The second light source has a numerical aperture of $NA_{S2}$, wherein $NA_{LDF}$>$NA_{S2}$, and preferably $NA_{LDF}$−$NA_{S2}$>0.05. For example, in some embodiments, $NA_{LDF}$−$NA_{S2}$≥0.1. Also preferably, 0.05≤$NA_{S2}$≤0.3.

With reference to FIG. 1B, according to some embodiments the illumination device 1 further comprises a delivery fiber having a numerical aperture $NA_{delivery}$, wherein (i) the light source is coupled to one end the delivery fiber and the light diffusing optical fiber is coupled to another end of said delivery fiber, and $NA_{delivery}$<$NA_{LDF}$. For example, in some embodiments, preferably $NA_{LDF}$−$NA_{delivery}$>0.05. For example, in some embodiments, $NA_{LDF}$−$NA_{delivery}$≥0.1. The light diffusing fibers 100 can be easily connected to low loss delivery fiber 500C, such as transmission fiber or a fiber that provides light amplification (e.g., a fiber that includes gain medium in the core), thereby allowing a light source to be remotely placed away from light diffusing fiber 100. For example, the delivery fiber 500C can be standard multimode fiber with 50 µm core diameter, $NA_{delivery}$=0.22, or 62.5 µm core diameter, $NA_{delivery}$=0.22, or 105 µm core diameter, $NA_{delivery}$=0.22. The transmission optical fiber 500C exhibits low light loss along its length, such that light in substantial portion delivered to one end is transmitted to a second end. In the embodiment depicted in FIG. 1B, light source 500 comprises a light source component 500A coupled transmission optical fiber 500C. In this embodiment, light emitted by the light source component 500A is transmitted through the transmission optical fiber 500C to the light-diffusing optical fiber 100, which scatters the light into the surrounding environment. Because the transmission optical fiber exhibits low light loss, light with sufficient intensity to illuminate the light-diffusing optical fiber 100 may be transmitted through the optical fiber 500C over an extended distance, such that the light source component 500A may be positioned at locations spaced apart from the light-diffusing optical fiber 100. Similarly, if the delivery fiber 500C is a laser fiber, or a fiber capable of providing light amplification, light with sufficient intensity to illuminate the light-diffusing optical fiber 100 is transmitted through the optical fiber 500C and the light source component 500A may be positioned at locations spaced apart from the light-diffusing optical fiber 100. In some embodiments, the light-diffusing optical fiber 100 may be separated from the light source component 500A electrically, structurally, and optically other than through an optical connection with a transmission optical fiber 500C. This helps to deal with heat dissipation and bring additional flexibility to the design of illumination devices.

Because light emitted by the light source component 500A is scattered into the surrounding environment by the light-diffusing optical fiber 100, the light source component 500A may be positioned at a location remote from the light-diffusing optical fiber 100. Accordingly, any thermal heat generated by the light source component 500A may be transferred away from the light source light source component 500A at positions remote from the light-diffusing optical fiber 100. The thermal temperature of the light-diffusing optical fiber 100, therefore, may remain substantially similar to the ambient temperature of the surrounding environment and the lighting unit may be described as a thermally "cool" lighting unit.

Figure 6:
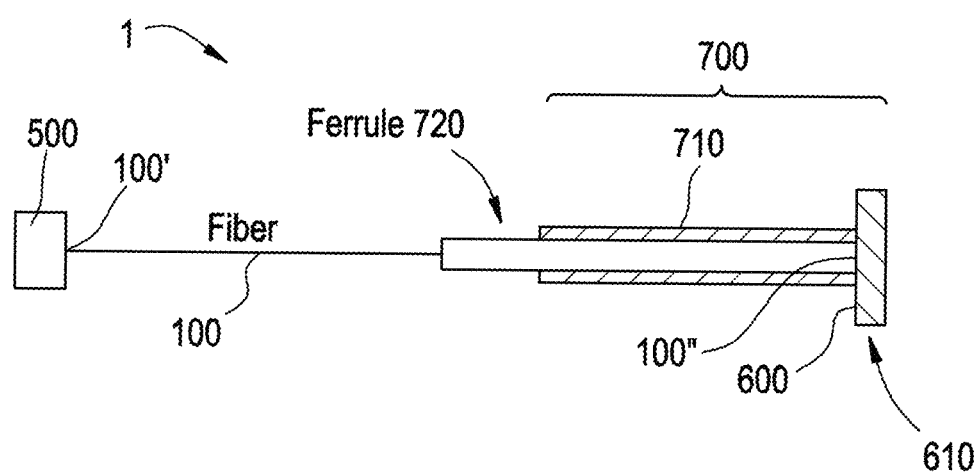
FIG. 6 illustrates schematically yet another embodiment of the illumination device that includes a light diffusing fiber, a light source coupled to one end of the fiber and a reflective surface situated on the other end of the fiber.

As shown in FIG. 6, according to some embodiments, the illumination device 1 further comprises a reflective surface 600, such that one end 100' of the light diffusing optical fiber (LDF) 100 is coupled to the light source 500, and the reflective surface 600 is coupled to another end 100" of the light diffusing optical fiber. For example, in some embodiments, the light diffusing optical fiber (LDF) 100 is coupled to a low-cost reflective module 700 that includes the reflective surface 600. In this embodiment the reflective module 700 is detachable, allowing easy re-configuration of the illumination device 1.

In the embodiment of FIG. 6, the reflective module 700 includes a tube 710, which is sized to fit over the standard FC type connector ferrule 720, such as reusable FC/PC connector used for 125 µm glass diameter fibers The inner diameter of the tube 710 is preferably about 2-5 µm wider than the outer diameter of the ferrule. Ferrule 720 is attached to the fiber 100 for easy connection to the reflective surface 600, at FC receptacle output port. The connector ferrule 720 fits snugly into the tube 720, but can pulled out if needed. The tube 710 is cut to have a cross-section perpendicular to the longitudinal axis plane, such that its axis is perpendicular to the reflective surface 600. In this embodiment the reflective surface 600 is provided by a small mirror 610, with dimensions 2 mm×2 mm, or less, and the tube 710 is attached to this mirror. Mirror 610 is attacked to the ferrule 720, and can be for example, a small glass plate (e.g., display glass 0.6 to 1.1 mm thick) with an aluminum coating, or a reflective film or coating. The light diffusing optical fiber (LDF) 100 can, when needed, be easily detached from the reflective module 700. In this embodiment, the mirror 610 is cut of large sheet of thin (e.g., 0.7-1 mm) glass. The mirror 610 has a dielectric or metal coating reflective at the light source's wavelength (e.g., the wavelength provided by a laser diode, LD) and is glued to the tube 710. This simple fixture is attached to the ferrule, such that a cleaved and polished fiber tip touches the reflective surface 600. This exemplary embodiment of the reflective module 700 provides an effective and cost effective way of making end mirrors for lighting fixtures with single light a source for low cost LDF applications.

Figure 7:
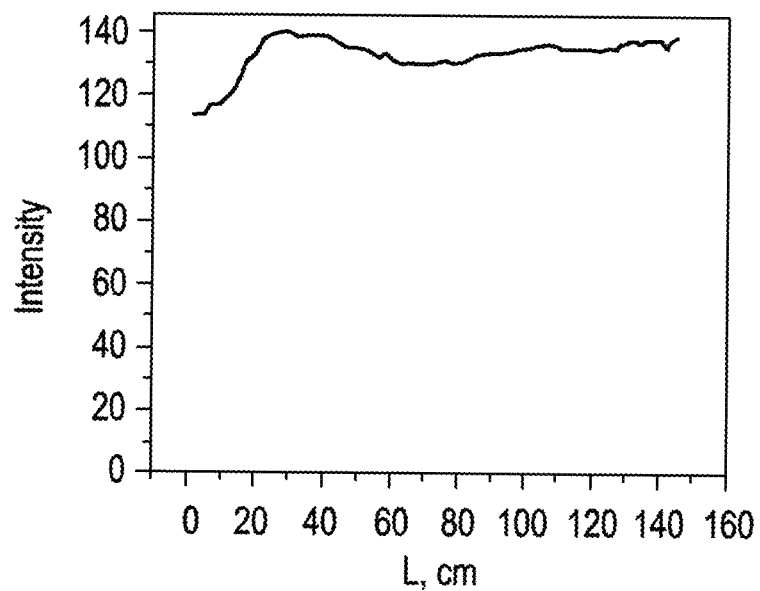
FIG. 7 is a plot of measured intensity along the length of light diffusing fiber of the illumination device of FIG. 6.

FIG. 7 illustrates modeled light intensity in another embodiment of the illumination device 1. In this embodiment, the numerical aperture $NA_{LDF}$ of the light diffusing optical fiber 100 is 0.35, the fiber 100 has a length L=1.5 m, and the light source 500 has a numerical aperture $NA_{S1}$=0.2. More specifically, light diffusing optical fiber 100 is coupled via fiber end 100' to a light source component 500A (blue laser diode, LD, providing light at wavelength of 445 nm) through the lens 500B. The fiber 100 has a coating that includes Ce-Yag phosphor. The diameter of this fiber was 500 µm. This exemplary fiber provides white light illumination. The color conversion of blue light to white is done using Ce-Yag phosphor placed in the coating of the fiber 100. The output from lens 550B has numerical aperture of 0.22 and the lens creates spot size less than 80 µm in diameter at the fiber core at the end 100'. The spot is imaged onto the fiber core 110, which is 125 µm in diameter. In this embodiment, $NA_{LDF}$−$NA_{S1}$=0.13. The other end 100" of the optical fiber 100 was attached to an aluminum mirror 600. That is, in this embodiment the illumination device 1 further comprises a reflective surface 600, such that one end 100' of the light diffusing optical fiber (LDF) 100 is coupled to the light source 500, and the reflective surface 600 is coupled to the end 100" of the light diffusing optical fiber 100.

Figure 8:
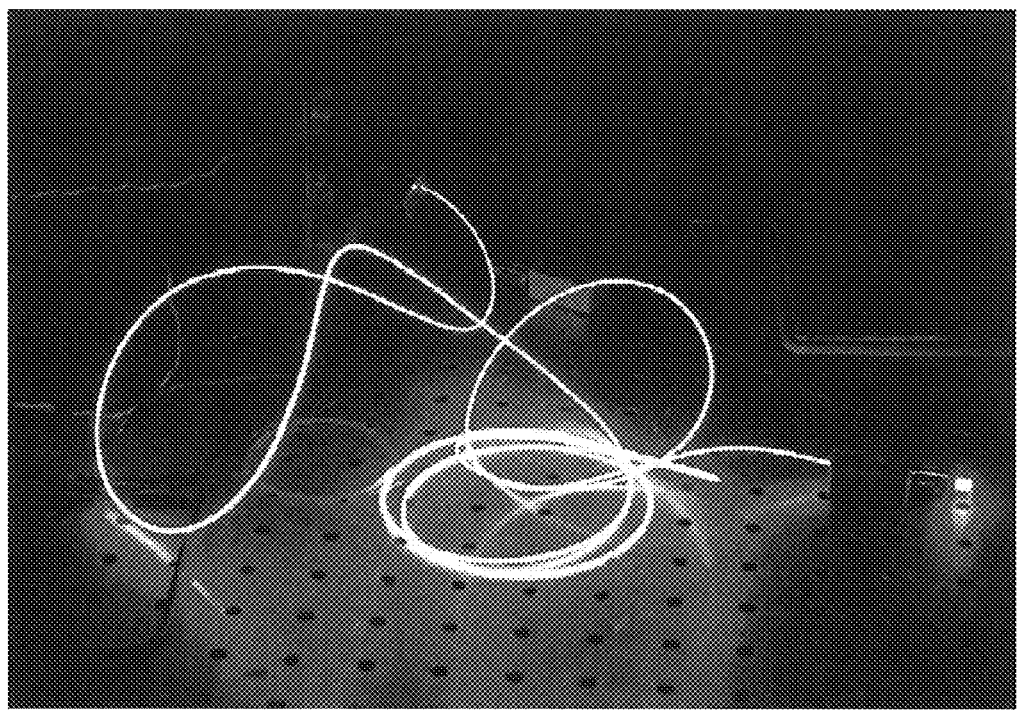
FIG. 8 is a photograph of light diffusing fiber that corresponds to FIG. 7.

More specifically, FIG. 7 illustrates light intensity distribution measured with a CCD camera along the length of this fiber embodiment. Uniformity from one end of the optical fiber to the other end of the optical fiber 100 of this embodiment is about 90% (min intensity/max intensity=0.9). A photograph of this fiber is shown in FIG. 8. This photograph illustrates that the fiber 100 appears to be uniform in intensity. That is, FIG. 8 illustrates that this fiber provides uniform illumination (end-to-end). The use of yellow phosphor such as Ce-YAG placed on the surface of the fiber 100 enables making bright a flexible illumination device providing white color light. The brightness of the fiber is shown can exceed 10000 lux. The flexibility of thin glass fibers enables the light diffusing fiber 100 to be deployed in complex configurations and shapes in special lighting applications. Light from the fiber can also be coupled 100 into glass sheets for illumination purposes.

Preferably, according to some embodiments the light source 500 generates light in the 200 nm to 500 nm wavelength range and fluorescent material in the light diffusing fiber 100 can generate either white, green, red, or NIR (near infrared) light. The wavelength of the light scattered by the fluorescent material is different from the wavelength of the light propagating in the fiber core. According to some embodiments the light source 500 coupled to the LDF 100 generates light in 200 nm to 1200 nm wavelength range, which is determined by wavelength(d) of the light source (or multiple light sources).

According to some embodiments of the illumination device the light diffusing optical fiber further comprises a scattering/homogenizing coating surrounding the core. The scattering/homogenizing coating may include, for example, at least one of the following scattering materials: titania, alumina, zirconia, silica.

Figure 2A:
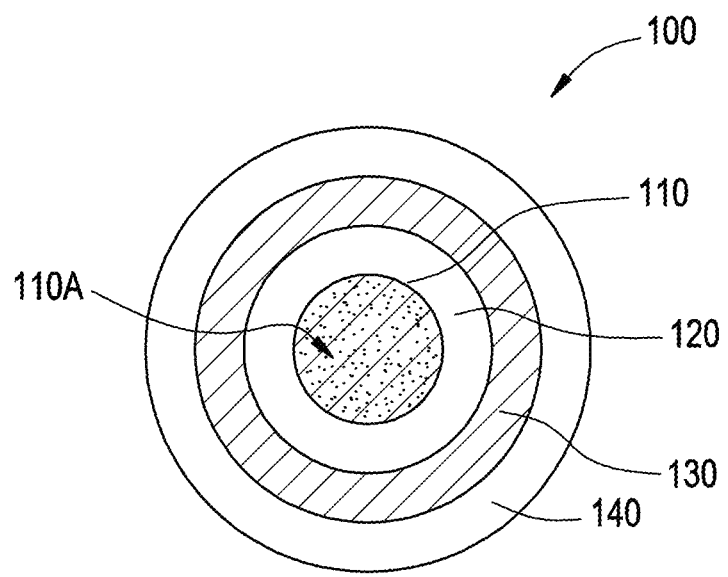
FIGS. 2A through 2D are schematic illustrations of several embodiments of light diffusing fibers (LDF).
Figure 2B:
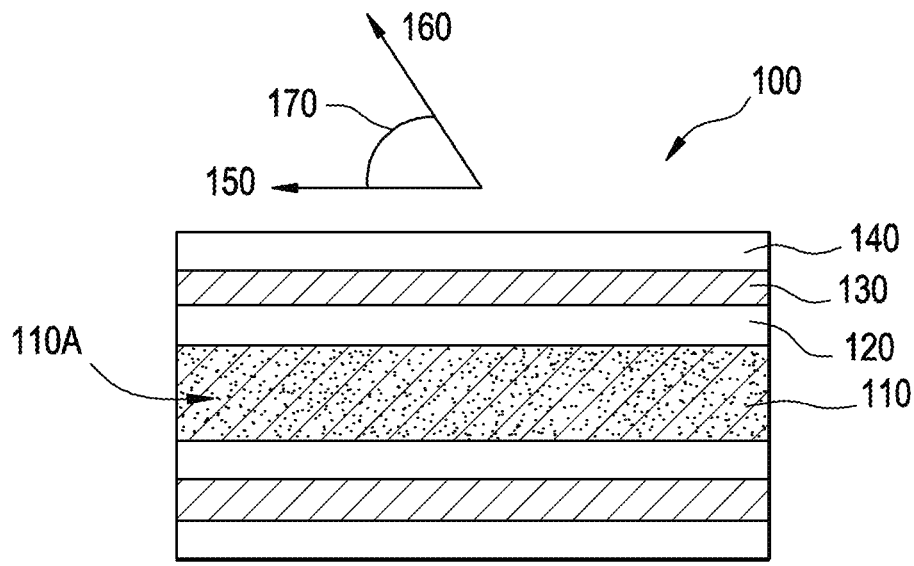
Figure 2C:
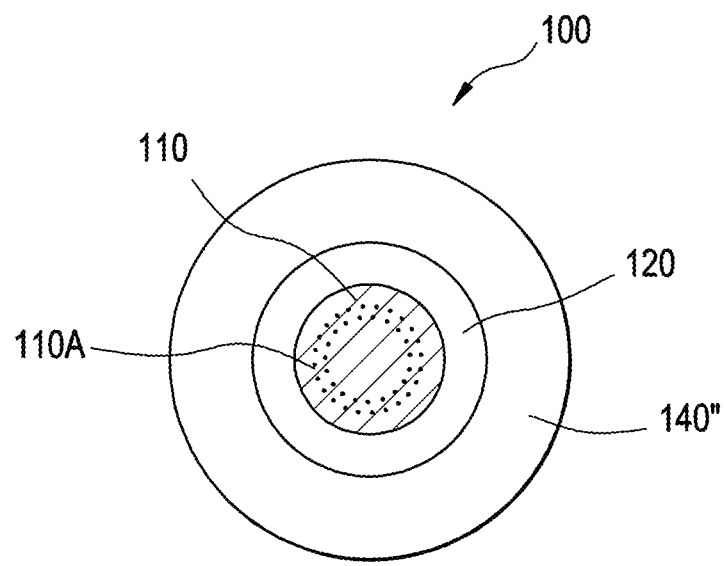

Referring now to FIGS. 2A and 2B, one embodiment of a light diffusing optical fiber 100 is schematically depicted. The light diffusing optical fiber 100 generally comprises a core 110, which further comprises a scattering region. The scattering region may comprise scattering particles or scattering structures 100A, for example gas filled voids, such as shown in U.S. application Ser. Nos. 12/950,045, 13/097,208, and 13/269,055, herein incorporated by reference, or may comprise the inclusion of scattering particles, such as micro- or nanoparticles of ceramic materials, into the fiber core.

For example, the gas filled voids (e.g., air lines) may occur throughout the fiber core 110, or may occur near the interface of the core and cladding 120, or may occur in an annular ring within the core. The gas filled voids may be arranged in a random or organized pattern and may run parallel to the length of the fiber or may be helical (i.e., rotating along the long axis of the fiber). The scattering region 116' may comprise a large number of gas filled voids, for example more than 50, more than 100, or more than 200 voids in the cross section of the fiber. The gas filled voids may contain, for example, $SO_2$, Kr, Ar, $CO_2$, $N_2$, $O_2$, or mixtures thereof. The cross-sectional size (e.g., diameter) of the voids (or other scattering particles) may be from about 10 nm to about 10 μm and the length may vary from about 1 μm to about 50 m. In some embodiments, the cross sectional size of the voids (or other scattering particles) is about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the length of the voids is about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1000 μm, 5 mm, 10 mm, 50 mm, 100 mm, 500 mm, 1 m, 5 m, 10 m, 20 m, or 50 m.

More specifically, FIGS. 2A and 2B illustrate schematically an embodiment of light diffusing fiber (LDF) 100 with a modified coating 140 or a jacket surrounding the fiber for providing uniform angular scattering over a large angular range (e.g., 40 to 120°, or 30° to 130°, or 15 to 150°). For example, according to the exemplary embodiments disclosed herein the illumination device 1 is configured to provide substantially uniform illumination due to scattering, such that the difference between the minimum and maximum scattering illumination intensity is less than 50% of the maximum scattering illumination intensity, for all viewing angles between 40 and 120 degrees.

The light diffusing fiber of this exemplary embodiment includes a glass core 110 with a plurality of light scattering nanostructures (gas filled voids), a polymer cladding 120, and a secondary coating 130. However, in some embodiments the cladding 120 is glass. As discussed above, light diffusing fiber (LDF) 100 has a numerical aperture of $NA_{LDF}$. Other light diffusing fibers or side emitting fibers with $NA_{LDF}$ such that $NA_{LDF}-NA_{S1}>0.05$ ($NA_{LDF}-NA_{S1}>0.1$) may also be utilized.

In the embodiment shown in FIGS. 2A and 2B, the core portion 110 comprises silica-based glass and has an index of refraction, n. In some embodiments, the index of refraction for the core is about 1.458. The core portion 110 may have a radius of from about 10 μm to about 600 μm. In other embodiments, the radius of the core is about 50 μm to about 100 μm. In some embodiment the radius of the core is from about 30 μm to about 400 μm. In other embodiments, the radius of the core is about 125 μm to about 300 μm. In still other embodiments, the radius of the core is about 50 μm, 60 μm, 70 μm, 80 μm, 90 μm, 100 μm, 120 μm, 140 μm, 160 μm, 180 μm, 200 μm, 220 μm, 240 μm, or 250 μm.

The scattering particles and/or voids 110A in the core 110 are utilized to scatter light propagating in the core of the light diffusing optical fiber 100 such that the light is directed radially outward from the core portion 110, exiting the outer surface of the fiber, and thereby illuminating the light diffusing optical fiber and the space surrounding the light diffusing optical fiber. For example, the scatter-induced attenuation may be increased through increasing the concentration of voids (or other scattering objects), positioning voids (or other scattering objects) throughout the fiber 100. Also for example, in cases where the position of the voids (or other scattering objects) are limited to a scattering region core 116 that is in a faun of an annular ring (see FIG. 4, for example), increasing the width of the annulus comprising the voids will increase the scattering-induced attenuation for the same density of voids. That is, the magnitude of scattered light and thus the amount of scatter-induced attenuation depends on the size of the scattering structures 110A, their density, and the relative area of the scattering region 116 (relative to the overall size of the fiber core 110).

Still referring to FIGS. 2A and 2B, the light diffusing optical fiber 100 may further comprise a cladding 120 which surrounds and is in direct contact with the core portion 110. The cladding 120 may be formed from a material which has a low refractive index (e.g., depressed index relative to silica) in order to increase the numerical aperture ($NA_{LDF}$) of the light diffusing optical fiber 100. In some embodiments, the cladding has a refractive index of less than about 1.415, and preferably less than 1.35. For example, the numerical aperture $NA_{LDF}$ of the light diffusing optical fiber 100 may be greater than about 0.3, and in some embodiments greater than about 0.4 or greater than 0.5. In one embodiment, the cladding 120 comprises a low index polymeric material such as UV or thermally curable fluoroacrylate, such as PC452, available from SSCP Co. Ltd 403-2, Moknae, Ansan, Kyunggi, Korea, or silicone. In other embodiments, the cladding comprises a urethane acrylate, such as CPC6, manufactured by DSM Desotech, Elgin, Ill. In still other embodiments the cladding 120 comprises a silica glass which is down-doped with a down-dopant, such as, for example, fluorine or boron. In some embodiments, the cladding comprises a high modulus coating. The cladding 120 generally has an index of refraction which is less than the index of refraction of the core portion 110. In some embodiments, the cladding 120 is a low index polymer cladding with a relative refractive index that is negative relative to pure silica glass. For example, the relative refractive index of the cladding may be less than about −0.5% and in some embodiments less than −1%, relative to pure silica (which is considered to be at 0%). The cladding 120 generally extends from the outer radius of the core portion 110. In some embodiments described herein, the radial width of the cladding is greater than about 10 μm, greater than about 20 μm, greater than about 50 μm or greater than about 70 μm. In some embodiments, the cladding has a thickness of about 10 μm, 20 μm, 30 μm, 40 μm, 50 μm, 60 μm, 70 μm, 80 μm, 90 μm, or 100 μm. If the glass core diameter is about 50 μm to 200 μm, and the cladding thickness is about 50 μm, the outer diameter of the uncoated fiber is 150-300 μm. As stated above, the cladding 120 may be glass or polymer. Glass cladding 120 may be preferable when fiber is utilized in high power or UV applications. The absorption losses within the fiber 100 are negligible, and the scattering losses, and thus the amount of scatter-induced attenuation in some embodiments are 5-7 dB/m. The bending induced losses can be small (if the $NA_{LDF}$ of the light diffusing fiber 100 is high, for example >0.35, bending losses are small), even with fiber bending radius as small as 5 mm.

The light diffusing fiber 100 may also comprise a substantially clear layer corresponding to a secondary coating typical for all optical fibers for ease of mechanical handling. For example, FIGS. 2A and 2B illustrate the light diffusing optical fiber 100 that comprises a secondary coating layer 130 which surrounds and is in direct contact with the cladding 120. The secondary layer may be a polymer coating. In at least some embodiments, the coating layer 130 has a constant diameter along the length of the light diffusing optical fiber 100.

The optical fiber 100 preferably includes a scattering layer or a scattering coating 140, or may be surrounded by a scattering jacket. The scattering (homogenizing) coating, jacket, or layer 140 may be situated on top of the secondary coating 130. In some embodiments the secondary coating layer and scattering layer may be combined into a single coating layer 140", depending on how the fiber is manufactured. This process is similar to post-draw ink application for optical fibers. However, it can be combined in one step in the draw, and in this case the secondary coating is not needed and the scattering/homogenizing layer 140 may be applied directly on top of the cladding.

Figure 2D:
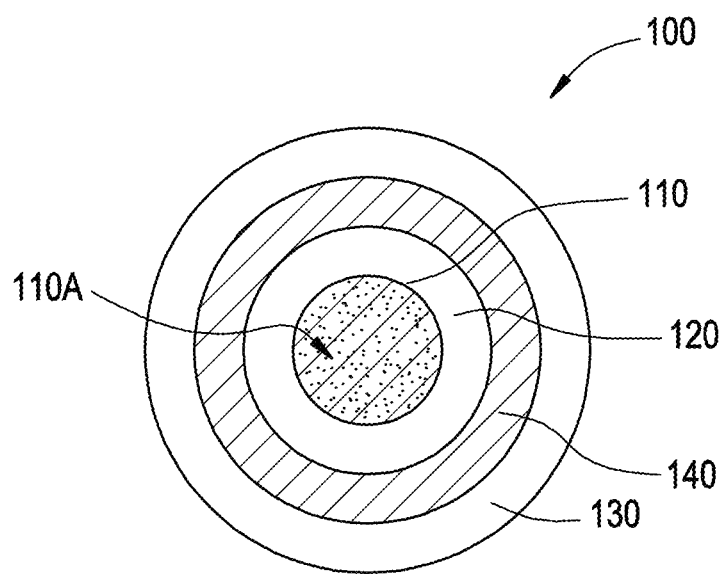

Referring again to FIGS. 2A and 2B, the coating, jacket or layer 140 comprises or is a scattering (homogenizing) layer and may be a polymer based coating. For example, the scattering jacket or coating or layer 140 may comprise any liquid polymer or pre-polymer material into which the scattering agent could is added. It may be applied to the fiber as a liquid and then converted to a solid after application to the fiber. In some embodiments, the scattering layer 140 comprises a polymer coating (such as, for example, the acrylate-based CPC6, manufactured by DSM Desotech, Elgin, Ill.), or a silicone-based polymer, further comprising a scattering material (e.g., nano or micro structures or voids). In some embodiments, it is most efficient to blend the scattering agents into standard UV curable acrylate based optical fiber coatings, such as Corning's standard CPC6 secondary optical fiber coating, thus combining the function of both layers 130 and 140 into a single coating 140" (FIG. 1C). For example, according to one embodiment, in order to make scattering blends, a concentrate is first made by mixing 30% by weight of the scattering agent $TiO_2$ into DSM 950-111 secondary CPC6 optical fiber coating and then passing the mix over a 3 roll mill. These concentrates are then either applied directly as coatings or are further diluted with DSM 950-111 to produce the desired scattering effect. In another embodiment the locations of layers 140 and 130 may be switched (FIG. 2D). In other embodiments the layer 140 may be surround the fiber 100, but spaced from it.

In some embodiments, the scattering layer 140 or a fiber jacket (also referred to herein as scattering or homogenizing coating) may be utilized to enhance the distribution and/or the nature of the light emitted radially from the core portion 110 and passed through the optional cladding 120 and/or the optional layer 130. The scattering material in the jacket or layer 140 may comprise nano or microparticles with an average diameter of from about 200 nm to about 5 μm. In some embodiments, the average diameter of the particles is about 200 nm, 300 nm, 400 nm, 500 nm, 600 nm, 700 nm, 800 nm, 900 nm, 1 μm, 2 μm, 3 μm, 4 μm, 5 μm. The concentration of the scattering particles may vary along the length of the fiber or may be constant and may be a weight percent sufficient to provide even scattering of the light while limiting overall, attenuation. In some embodiments, the weight percentage of the scattering particles in the scattering layer comprises about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%. In some embodiments, the scattering layer 140 comprises small particles of a scattering material which comprise a metal oxides or other high refractive index material, such as, for example, $TiO_2$, ZnO, $SiO_2$, or Zr. The scattering material may also comprise micro- or nanosized particles or voids of low refractive index, such as gas bubbles. The scattering layer 140 generally extends either from the outer radius of the cladding 120 or from the outer diameter of the coating layer 130. (See FIGS. 2A-2D) In some embodiments described herein, the radial width of the scattering layer 140 is greater than about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, or 100 μm.

In some embodiments, the scattering material may contain $TiO_2$-based particles, such as a white ink, which provides for an angle independent distribution of light scattered from the core portion 110 of the light diffusing optical fiber 100. In some embodiments, the scattering particles comprise a sublayer within the scattering layer. For example, in some embodiments, the particle sublayer may have a thickness of about 1 μm to about 5 μm. In other embodiments, the thickness of the particle layer and/or the concentration of the particles in the scattering layer may be varied along the axial length of the fiber so as to provide more uniform variation in the intensity of light scattered from the light diffusing optical fiber 100 at large angles (i.e., angles greater than about 15 degrees. For examples, the angular illumination for all viewing angles between 40 and 120 degrees is within 50% of maximum illumination, and in some embodiments within 30%. In some embodiments, the angular illumination for all viewing angles between 40 and 120 degrees is within 30% of maximum illumination, and in some embodiments within 25%.

In some embodiments the scattering agent within the scattering layer 140 could be any scattering material that has a refractive index differential from the matrix of coating (i.e., e.g. from base polymer) material of more than 0.05 (e.g., the difference in refractive indices between polymer base and the scattering material is greater than 0.05). Preferably the difference in refractive indices between base material and the scattering material is at least 0.1. That is, the index of refraction of the scattering particles is preferably at least 0.1 larger than the index of refraction of the base material (e.g., of the polymer or other matrix material) of the scattering layer 140. The scattering material(s) (also referred to as a scattering agent(s) herein) can be solid particles, liquid droplets, or gas bubbles. If, for example, the scattering material is solid particles, these solid scattering particles can be either organic or inorganic. If the scattering material is organic, the particles can be pigments, polymers, or any organic material that can be incorporated into the base matrix material as a powder. Scattering agents can also be generated in-situ, via crystallization and/or phase separation. Examples of these are, but not limited to, polyethylene, polypropylene, syndiotactic polystyrene, nylon, polyethylene terephthalate, polyketones, and polyurethanes where the urethane functional groups align and crystallize during solidification.

For example, during the cure or solidification of the matrix material, one can form crystals that function as light scattering sites. Also, for example, one can choose matrix materials, such that the material mixture in the matrix becomes incompatible during cure or solidification, causing it to phase separate into droplets or particles that can scatter light, thus forming scattering sites. Example of these would be, but are not limited to, styrene-butadiene-styrene block copolymers, polymethyl methacrylate in polystyrene, and acrylonitrile-butadiene-styrene.

If the scattering material is inorganic, the scattering particles can be, for example, pigments, oxides, or mineral fillers. Both the organics and inorganics scattering particles can be generated, for example, from grinding a solid, or as small particles initially (, for example, from emulsion polymerization or solgels). Preferably the solid scattering particles (or scattering agents) are inorganic oxides like silica, alumina, zirconia, titania, cerium oxide, tin oxide, and antimony oxide. Ground glass, ceramics, or glass-ceramics can also be utilized as scattering agents. Ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, and cristobalite can utilized in layer 140 as scattering particles, to provide the uniform angular illumination intensity of the diffused light.

The cross-sectional size of the scattering particles within the scattering layer 140 is $0.1\lambda$ to $10\lambda$, where $\lambda$ is the wavelength of light propagating through the light diffusing fiber 100. Preferably the cross-sectional size d of the scattering particles is greater than $0.2\lambda$ and less than $5\lambda$, and more preferably between $0.5\lambda$ and to $2\lambda$. The amount of scattering particles can vary from about 0.005% to 70% by weight, preferably 0.01 to 60% and most preferably 0.02 to 50%. In general, the thinner the scattering layer or scattering coating 140, the larger amount of scattering particles should to be present within that scattering layer.

Referring to FIG. 2B, in the embodiment shown, unscattered light propagates down the light diffusing fiber 100 from the source in the direction shown by arrow 150. Scattered light is shown exiting the light diffusing fiber as arrow 160 at an angle 170, which describes the angular difference between the direction of the fiber and the direction of the scattered light when it leaves light diffusing fiber 100. In some embodiments, the visible, and/or near IR spectrum of the light diffusing fiber 100 is independent of angle 170. In some embodiments, the intensities of the spectra when angle 170 is between 15° and 150°, or 30° and 130° are within ±50%, ±30%, ±25%, ±20%, ±15%, ±10%, or ±5% as measured at the peak wavelength. Thus, the illumination device 1 can provide uniform angular illumination, as well as uniform illumination along the length of the fiber(s) 100. In some embodiments, the intensities of the spectra when angle 170 is between all angles within 30° and 130°, or 40° and 120° are at least within ±50%, for example ±30%, ±25%, ±20%, ±15%, ±10%, or ±5% as measured at the peak wavelength. Thus, the illumination device 1 can provide uniform angular illumination, as well as uniform illumination along the length of the fiber(s) 100. Accordingly, illumination device 1 is configured to provide substantially uniform illumination due to scattering, such that the difference between the minimum and maximum scattering illumination intensity is less than 50% of the maximum scattering illumination intensity, for all viewing angles between at least 40 degrees and 110 degrees, for example for all viewing angles between 40 degrees and 120 degrees. According to some embodiments, the difference between the minimum and maximum scattering illumination intensity is not greater than 30% of the maximum scattering illumination intensity.

In some embodiments described herein the light diffusing optical fibers will generally have a length from about 0.15 m to about 100 m. In some embodiments, the light diffusing optical fibers, for example, have a length of about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

100731 Further, the light diffusing optical fibers (LDFs) 100 described herein have a scattering induced attenuation loss of greater than about 0.2 dB/m at a wavelength of 550 nm. For example, in some embodiments, the scattering induced attenuation loss (attenuation loss due to scattering centers, such as air lines for example) may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, or 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 550 nm.

As described herein, the light diffusing fiber can be constructed to produce uniform illumination along the entire length of the fiber or uniform illumination along a segment of the fiber which is less than the entire length of the fiber. The phrase "uniform illumination," when referring to the illumination along the length, as used herein, means that the intensity of light emitted from the light diffusing fiber does not vary by more than 25% over the specified length, L, where $0.1 \geq L \geq 100$ m. $\Delta 2_{MIN}$ In at least some embodiments, the average scattering loss of the fiber is greater than 50 dB/km, and the scattering loss does not vary more than 20% (i.e., the scattering loss is within ±20% of the average scattering loss, for example within ±15%, or within ±10%) over any given fiber segment of 0.2 m length. In at least some embodiments, the average scattering loss of the fiber is greater than 50 dB/km, and the scattering loss does not vary more than 20% (i.e., the scattering loss is within ±20% of the average scattering loss, for example within ±15%, or even within ±10%) over any given fiber segment of 0.5 m length. In at least some embodiments, the average scattering loss of the fiber is greater than 50 dB/km, and the scattering loss does not vary more than 20% (i.e., the scattering loss is within ±20% of the average scattering loss, for example within ±15%, or within ±10%) over any given fiber segment of 1 m length. In at least some embodiments, the average scattering loss of the fiber is greater than 50 dB/km, and the scattering loss does not vary more than 20% (i.e., the scattering loss is within ±20% of the average scattering loss, for example within ±15%, or within ±10%) over any given fiber segment of 3 m length. In at least some embodiments, the average scattering loss of the fiber is greater than 50 dB/km, and the scattering loss does not vary more than 20% (i.e., the scattering loss is within ±20% of the average scattering loss, for example within ±15%, or within ±10%) over any given fiber segment of 5 m length. In at least some embodiments, the average scattering loss of the fiber is greater than 50 dB/km, and the scattering loss does not vary more than 15% (i.e., the scattering loss is within ±15% of the average scattering loss, for example within ±10%, or within ±5%) over any given fiber segment of 10 m length. For example, in at least some embodiments, the average scattering loss of the fiber is greater than 50 dB/km, and the scattering loss does not vary more than 20% (i.e., the scattering loss is within ±20% of the average scattering loss, for example within ±15%, or within ±10%) over any given fiber segment of $0.2 \text{ m} \geq L \geq 10$ m, $0.2 \text{ m} \geq L \geq 20$ m or $0.2 \text{ m} \geq L \geq 50$ m length.

Figure 9A:
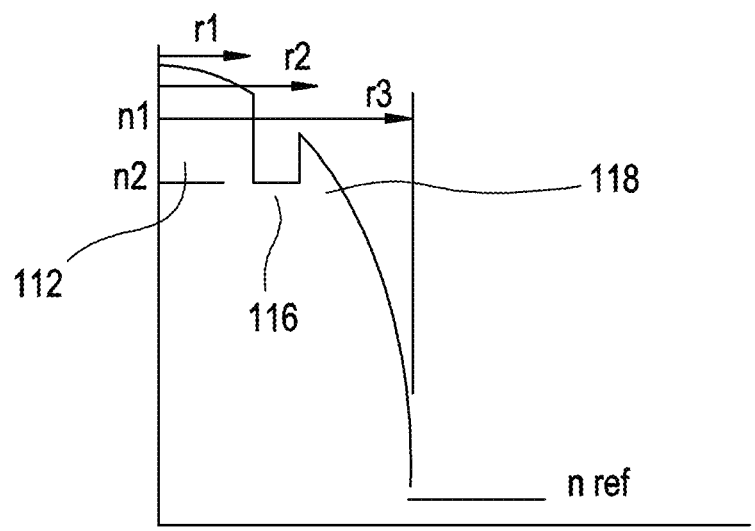
FIGS. 9A and 9B are schematic illustrations of the relative refractive index profiles exemplary embodiments of light diffusing fiber.
Figure 9B:
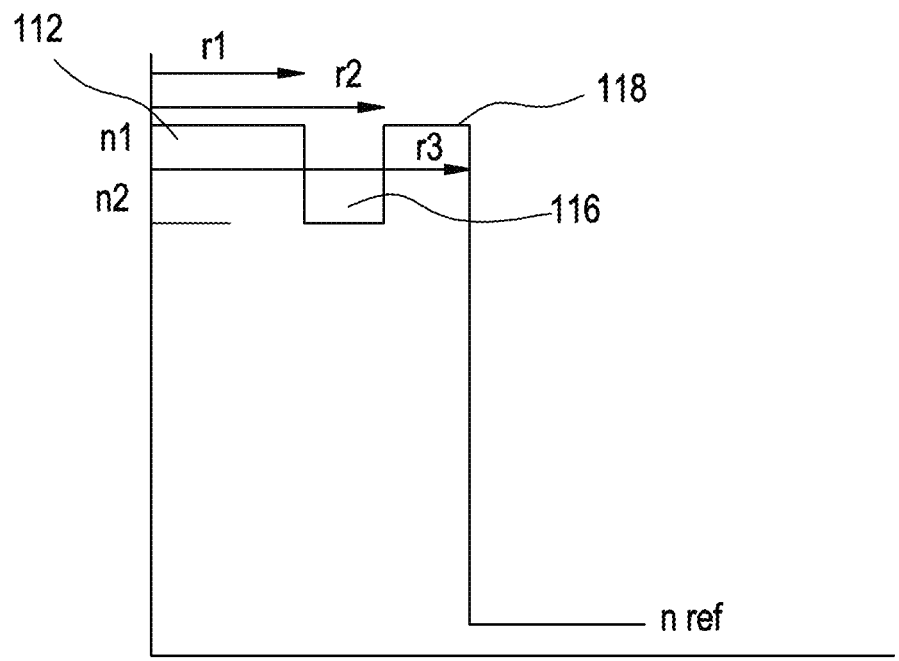

FIGS. 9A and 9B are schematic a plot of exemplary refractive index versus fiber radius for an example fiber 100 shown in FIG. 2A. As shown in FIG. 9A, the core 110 may have a graded core profile, characterized, for example, by an $\alpha$-value between 1.7 and 2.3 (e.g., 1.8 to 2.3). In this embodiment, the core region 112 extends radially outwardly from the centerline to its outer radius, R1, and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. In this embodiment, the second core region is a scattering region 116 (nano-structured region) having minimum refractive index n2, a relative refractive index profile $\Delta2(r)$, and a minimum relative refractive index $n2_{MIN}$ corresponding to $\Delta2_{MIN}$. The third core region 118 has a maximum refractive index n3, a relative refractive a relative refractive index profile (relative refractive index profile $\Delta3(r)$ with a maximum relative refractive index $\Delta3_{MAX}$ and a minimum relative refractive index $\Delta3_{MIN}$, where in some embodiments $\Delta3_{MAX}=\Delta3_{MIN}$). In this embodiment the annular cladding 120 has a refractive index n4, a relative refractive index profile $\Delta4(r)$ with a maximum relative refractive index $\Delta4_{MAX}$, and a minimum relative refractive index $\Delta4_{MIN}$. In some embodiments $\Delta4_{MAX}=\Delta4_{MIN}$. In some embodiments, $\Delta1_{MAX}>\Delta4_{MAX}$ and $\Delta3_{MAX}>\Delta4_{MAX}$. In the embodiment shown in FIG. 9A, $\Delta1_{MAX}>\Delta3_{MAX}$; $\Delta3_{MAX}>\Delta2_{MIN}$ and $\Delta2_{MIN}>\Delta4_{MAX}$.

In some embodiments, core regions 112, 118 have a substantially constant refractive index profile, as shown in FIG. 9B with a constant $\Delta1(r)$ and $\Delta3(r)$. In some of these embodiments, $\Delta2(r)$ is either slightly positive (e.g., $0<\Delta2(r)<0.1\%$), negative (e.g., $-0.1\%<\Delta2(r)<0$), or 0%. In some embodiments the absolute magnitude of $\Delta2(r)$ is less than 0.1%, preferably less than 0.05%. In some embodiments, the outer cladding region 120 has a substantially constant refractive index profile, as shown in FIG. 9B, with a constant $\Delta4(r)$. In some of these embodiments, $\Delta4(r)=0\%$. The core section 112 has a refractive index where $\Delta1(r)\geq0\%$. In some embodiments, the void-filled scattering region 116 has a relative refractive index profile $\Delta2(r)$ having a negative refractive index with absolute magnitude less than 0.05%, and $\Delta3(r)$ of the core region 118 can be, for example, positive or zero. In at least some embodiments, n1>n2 and n3>n4.

In some embodiments the cladding 120 has a refractive index $-0.05\%<\Delta4(r)<0.05\%$. In other embodiments, the cladding 120 and the core portions 112, 116, and 118 may comprise pure (undoped) silica.

In some embodiments, when cladding 120 is utilized, the cladding 120 comprises pure silica, F-doped silica, or F(fluorine)/B(boron) co-doped silica. In some embodiments, the cladding 120 comprises pure low index polymer. In some embodiments, scattering region 116 is nano-structured region that a comprises pure silica comprising a plurality of voids 116'. Preferably, the minimum relative refractive index and the average effective relative refractive index, taking into account the presence of any voids, of nano-structured scattering region 116 are both less than −0.1%.

In these embodiments the scattering structures 110A are gas filled voids, for example airlines. The voids may contain one or more gases, such as argon (Ar), nitrogen ($N_2$), oxygen ($O_2$), krypton (Kr), $CO_2$, or $SO_2$, or mixtures thereof, or can contain a vacuum with substantially no gas. However, regardless of the presence or absence of any gas, the average refractive index in nano-structured region 116 is lowered due to the presence of voids. The scattering structures 110A such as voids can be randomly or non-periodically disposed in the nano-structured scattering region 116. In other embodiments the voids are disposed periodically within the in nano-structured scattering region 116.

In example embodiments, the core section 112 comprises germania doped silica, the core inner annular region 118 comprises pure silica, and the cladding annular region 120 comprises a glass or a low index polymer. In some of these embodiments, the nano-structured scattering region 116 comprises a plurality of voids 116' in pure silica; and in yet others of these embodiments, the nano-structured scattering region 116 comprises a plurality of voids 116' in fluorine-doped silica.

In some embodiments, the outer radius, Rc, of the core is greater than 10 μm and less than 600 μm. In some embodiments, the outer radius Rc of the core is greater than 30 μm and/or less than 400 μm. For example, Rc may be 125 μm to 300 μm. In other embodiments, the outer radius Rc of the core 110 (please note that in the embodiment shown in FIGS. 9A and 9B, Rc=R3) is larger than 50 μm and less than 250 μm. The central portion 112 of the core 110 has a radius that is $0.1Rc\leq R_1\leq0.9Rc$, preferably $0.5Rc\leq R_1<09Rc$. The width W2 of the scattering region 116 (in this embodiment the width of the nano-structured region) is preferably $0.05Rc\leq W2\leq0.9Rc$, preferably $0.1Rc\leq W2\leq0.9Rc$, and in some embodiments $0.5Rc\leq W2\leq0.9Rc$ (a wider nano-structured region gives a higher scattering-induced attenuation, for the same density of nano-sized structures). The solid glass core region 118 has a width Ws=W3 such that $0.1Rc>W3>0.9Rc$. Each section of the core 110 comprises silica based glass. The radial width $W_2$ of nano-structured scattering region 116 is preferably greater than 1 μm. For example, $W_2$ may be 5 μm to 300 μm, and preferably 200 μm or less. In some embodiments, $W_2$ is greater than 2 μm and less than 100 μm. In other embodiments, W2 is greater than 2 μm and less than 50 μm. In other embodiments, $W_2$ is greater than 2 μm and less than 20 μm. In some embodiments, $W_2$ is at least 7 μm. In other embodiments, $W_2$ is greater than 2 μm and less than 12 μm. The width $W_3$ of the core region 118 is (R3−R2) and its midpoint $R_{3MID}$ is (R2+R3)/2. In some embodiments, $W_3$ is greater than 1 μm and less than 100 μm. The numerical aperture (NA) of fiber 100 is equal to or greater than the NA of a light source directing light into the fiber. Preferably the numerical aperture (NA) of fiber 100 is greater than 0.2, in some embodiments greater than 0.3, and more preferably greater than 0.4.

In some embodiments, the core outer radius R1 of the first core region 112 is preferably not less than 24 μm and not more than 50 μm, i.e. the core diameter is between about 48 and 100 μm. In other embodiments, R1>24 microns; in still other embodiments, R1>30 microns; in yet other embodiments, R1>40 microns.

In some embodiments, $|\Delta_2(r)|<0.025\%$ for more than 50% of the radial width of the annular scattering region 116, and in other embodiments $|\Delta_2(r)|<0.01\%$ for more than 50% of the radial width of the scattering region 116. In some embodiments, the cladding 120 has a relative refractive index profile $\Delta4(r)$ having a maximum absolute magnitude less than 0.1%, and in this embodiment $\Delta4_{MAX}<0.05\%$ and $\Delta4_{MIN}>-0.05$.

Cladding 120 extends to a radius R4, which is also the outermost periphery of the uncoated optical fiber. In some embodiments, the width of the cladding, R4−R3, is greater than 20 μm; in other embodiments R4−R3 is at least 50 μm, and in some embodiments, R4−R3 is at least 70 μm.

In another embodiment, the entire core 110 is nano-structured (filled with voids 116', for example), and the core 110 is surrounded by the cladding 120. In these embodiments the entire core 110 is a void-filled scattering region 116. The core 110 may have a "step" refractive index delta, or may have a graded core profile, with the α-profile having, for example, α-value between 1.8 and 2.3. Other light diffusing fibers may utilize scattering structures situated at the core cladding boundary or in the cladding.

We claim:

1. An illumination device comprising:
   (i) a light diffusing optical fiber having a numerical aperture of $NA_{LDF}$, wherein said light diffusing optical fiber has an outer surface, two ends, and a glass core comprising a region with a plurality of nano-sized structures within said core configured to scatter guided light via said nano-sized structures towards the outer surface providing scattering-induced attenuation greater than 50 dB/km at illumination wavelength, wherein said scatter guided light diffuses through said outer surface to provide illumination;
   (ii) a light source having a numerical aperture of $NA_{S1}$, said light source being optically coupled to one end of said light diffusing optical fiber; and
   (iii) wherein $NA_{LDF}-NA_{S1}>0.05$ and, $0.05 \leq NA_{S1} \leq 0.30$, and $0.31 \leq NA_{LDF} \leq 0.52$.

2. The illumination device of claim 1, wherein $NA_{LDF}-NA_{S1}>0.1$.

3. The illumination device of claim 1, wherein $0.15 \leq NA_{S1} \leq 0.25$.

4. The illumination device of claim 1, wherein $0.31 \leq NA_{LDF} \leq 0.48$.

5. The illumination device of claim 1, further comprising a second light source, said second light source being coupled to a second end of said light diffusing optical fiber, said second light source light source having a numerical aperture of $NA_{S2}$, wherein $NA_{LDF}-NA_{S2}>0.05$.

6. The illumination device of claim 5, wherein $NA_{LDF}-NA_{S2}>0.1$.

7. The illumination device of claim 5, wherein $0.15 \leq NA_{S2} \leq 0.25$.

8. The illumination device of claim 1, further comprising a reflective surface, said reflective surface being coupled to another end of said light diffusing optical fiber.

9. The illumination device of claim 1, wherein said light source is a laser diode.

10. The illumination device of claim 1, wherein said light diffusing optical fiber further comprises a light scattering/homogenizing coating surrounding said core.

11. The illumination device of claim 1, wherein said coating includes titania.

12. The illumination device of claim 1 wherein: said light diffusing optical fiber includes a low index cladding surrounding said core, said cladding having a lower refractive index delta than said core.

13. The illumination device of claim 1, further including phosphorus containing coating surrounding said core.

14. The illumination device of claim 1, wherein: the core diameter is greater than 50 μm and less than 500 μm; and/or (ii) $NA_{LDF}>0.2$.

15. The illumination device of claim 1, wherein scattering-induced attenuation greater than 100 dB/km at illumination wavelength.

16. The illumination device of claim 1 wherein said nano-sized structures are voids filled with gas.

17. The illumination device of claim 16 wherein said nano-sized structures are voids filled with $SO_2$.

18. The illumination device of claim 1 wherein said fiber is configured to be capable of guiding said light such that radiation out of said outer surface is substantially uniform, such that the difference between the minimum and maximum scattering illumination intensity is less than 50% of the maximum scattering illumination intensity, for all viewing angles between 40 and 120 degrees.

19. The illumination device of claim 1 wherein said fiber having scattering-induced attenuation is 100 dB/km to 60000 dB/km at illumination wavelength.

20. An illumination device comprising:
   (i) a light diffusing optical fiber having a numerical aperture of $NA_{LDF}$, wherein said light diffusing optical fiber has an outer surface, two ends, and the fiber comprising a region with a plurality of scattering structures within said fiber configured to scatter guided light via said scattering structures towards the outer surface providing scattering-induced attenuation greater than 50 dB/km at illumination wavelength, wherein said scatter guided light diffuses through said outer surface to provide illumination;
   (ii) a light source having a numerical aperture of $NA_{S1}$, said light source being optically coupled to one end of said light diffusing optical fiber; and
   wherein $NA_{LDF}-NA_{S1}>0.05$, $0.05 \leq NA_{S1} \leq 0.30$, and $0.31 \leq NA_{LDF} \leq 0.52$.

21. The illumination device of claim 20 wherein the illumination device is configured to provide substantially uniform illumination due to scattering, such that the difference between the minimum and maximum scattering illumination intensity is less than 50% of the maximum scattering illumination intensity, for all viewing angles between 40 and 120 degrees.

* * * * *